(12) United States Patent
Jeunesse et al.

(10) Patent No.: US 9,950,679 B2
(45) Date of Patent: Apr. 24, 2018

(54) FABRICATION METHOD FOR MAKING AN EQUIPMENT DEVICE FOR AN AUTOMOTIVE VEHICLE AND ASSOCIATED EQUIPMENT DEVICE FOR AN AUTOMOTIVE VEHICLE COMPRISING A COMPOSITE BODY

(71) Applicant: Faurecia Automotive Industrie, Nanterre (FR)

(72) Inventors: Steve Jeunesse, Mouzon (FR); Xavier Bathelier, Saint Pierremont (FR)

(73) Assignee: Faurecia Automotive Industrie, Nanterre (FR)

( * ) Notice: Subject to any disclaimer, the term of this patent is extended or adjusted under 35 U.S.C. 154(b) by 109 days.

(21) Appl. No.: 14/966,951

(22) Filed: Dec. 11, 2015

(65) Prior Publication Data
US 2016/0167597 A1    Jun. 16, 2016

(30) Foreign Application Priority Data

Dec. 12, 2014   (FR) ..................................... 14 62332

(51) Int. Cl.
*B60R 13/08*      (2006.01)
*B29C 51/02*      (2006.01)
(Continued)

(52) U.S. Cl.
CPC ............ *B60R 13/083* (2013.01); *B29C 51/02* (2013.01); *B29C 51/145* (2013.01); *B32B 3/26* (2013.01);
(Continued)

(58) Field of Classification Search
CPC ....... B60R 13/083; B60R 13/011; B32B 3/26; B32B 7/12; B32B 5/08; B32B 5/024;
(Continued)

(56) References Cited

U.S. PATENT DOCUMENTS 7,798,549 B2 *  9/2010  Dilley ....................... B60R 7/02
                                                    296/39.1
9,561,638 B2    2/2017  Jeunesse et al.
(Continued)

FOREIGN PATENT DOCUMENTS

CN          1564892 A      1/2005
CN        102896822 A      1/2013
(Continued)

OTHER PUBLICATIONS

Search Report corresponding to application No. FR 1462332, dated Nov. 17, 2015, 2 pages.
(Continued)

*Primary Examiner* — Joseph D. Pape
(74) *Attorney, Agent, or Firm* — Reising Ethington P.C.

(57) ABSTRACT

A fabrication method for fabricating an equipment part for an automotive vehicle. The method includes the following steps. Supplying a sheet comprising ceramic fibers and thermofusible polymer fibers, the melting temperature of the thermofusible polymer being higher than 200° C. Heating the sheet, at a temperature higher than 200° C., so as to melt the thermofusible polymer. Applying a fabric on the sheet, the fabric comprising filament yarns having a core made of polymer presenting a softening point temperature that is higher than or equal to 200° C. And then thermoforming of the fabric and the sheet in a conforming mold.

16 Claims, 4 Drawing Sheets

(51) Int. Cl.
| | |
|---|---|
| B29C 51/14 | (2006.01) |
| B32B 3/26 | (2006.01) |
| B32B 5/26 | (2006.01) |
| B32B 27/12 | (2006.01) |
| B32B 27/30 | (2006.01) |
| B32B 27/34 | (2006.01) |
| B32B 27/36 | (2006.01) |
| B32B 37/04 | (2006.01) |
| B32B 38/00 | (2006.01) |
| B60R 13/01 | (2006.01) |
| B32B 5/02 | (2006.01) |
| B32B 5/08 | (2006.01) |
| B32B 7/12 | (2006.01) |
| B32B 38/12 | (2006.01) |
| B29K 27/06 | (2006.01) |
| B29K 67/00 | (2006.01) |
| B29K 105/00 | (2006.01) |
| B29K 627/06 | (2006.01) |
| B29K 667/00 | (2006.01) |
| B29L 31/30 | (2006.01) |
| B29K 105/08 | (2006.01) |
| B29K 309/02 | (2006.01) |
| B29K 267/00 | (2006.01) |
| B29C 51/00 | (2006.01) |

(52) U.S. Cl.
CPC ............. *B32B 5/022* (2013.01); *B32B 5/024* (2013.01); *B32B 5/08* (2013.01); *B32B 5/26* (2013.01); *B32B 7/12* (2013.01); *B32B 27/12* (2013.01); *B32B 27/304* (2013.01); *B32B 27/34* (2013.01); *B32B 27/36* (2013.01); *B32B 37/04* (2013.01); *B32B 38/0012* (2013.01); *B32B 38/0036* (2013.01); *B32B 38/12* (2013.01); *B60R 13/011* (2013.01); *B29C 51/004* (2013.01); *B29K 2027/06* (2013.01); *B29K 2067/003* (2013.01); *B29K 2105/0097* (2013.01); *B29K 2105/0809* (2013.01); *B29K 2105/253* (2013.01); *B29K 2267/003* (2013.01); *B29K 2309/02* (2013.01); *B29K 2313/00* (2013.01); *B29K 2627/06* (2013.01); *B29K 2667/003* (2013.01); *B29L 2031/3005* (2013.01); *B29L 2031/3014* (2013.01); *B32B 2262/0238* (2013.01); *B32B 2262/0284* (2013.01); *B32B 2262/101* (2013.01); *B32B 2262/105* (2013.01); *B32B 2262/12* (2013.01); *B32B 2262/14* (2013.01); *B32B 2307/30* (2013.01); *B32B 2307/704* (2013.01); *B32B 2307/738* (2013.01); *B32B 2309/02* (2013.01); *B32B 2309/04* (2013.01); *B32B 2367/00* (2013.01); *B32B 2605/003* (2013.01)

(58) Field of Classification Search
CPC ..... B32B 5/022; B32B 38/12; B32B 5/26; B32B 27/12; B32B 27/304; B32B 27/34; B32B 7/04; B32B 38/0012; B32B 8/0036; B29C 51/145; B29C 51/02
USPC .................................................. 296/39.1, 39.3
See application file for complete search history.

(56) References Cited

U.S. PATENT DOCUMENTS

| | | | |
|---|---|---|---|
| 2004/0094986 A1* | 5/2004 | Landvik | ............... B32B 27/065 296/70 |
| 2004/0253888 A1 | 12/2004 | Iedema et al. | |
| 2006/0141260 A1 | 6/2006 | Haque et al. | |

FOREIGN PATENT DOCUMENTS

| | | |
|---|---|---|
| CN | 104159720 A | 11/2014 |
| DE | 102005028627 B3 | 12/2006 |
| FR | 2990896 A1 | 11/2013 |

OTHER PUBLICATIONS

Chinese Office Action in Chinese with English translation for CN application No. 201510927588, dated Apr. 26, 2017, 18 pages.
Chinese Office Action in Chinese with English translation for CN application No. 201510927588.X, dated Dec. 18, 2017, 12 pages.

* cited by examiner

FABRICATION METHOD FOR MAKING AN EQUIPMENT DEVICE FOR AN AUTOMOTIVE VEHICLE AND ASSOCIATED EQUIPMENT DEVICE FOR AN AUTOMOTIVE VEHICLE COMPRISING A COMPOSITE BODY

TECHNICAL FIELD

The invention relates to a fabrication method for fabricating a device or an equipment unit for an automotive vehicle.

BACKGROUND

The automotive vehicle equipment unit is intended to constitute a structuring equipment part in an automotive vehicle, such as shelving, flooring or lateral trim or lining for the trunk.

Current coverings and liners for flooring, shelving or lateral trim lining for the trunk of an automotive vehicle, are often considered easily soiled, having little to no abrasion-resistance and difficult to clean. They require the addition of floor/surface mats or plastic heel pieces.

The current coverings and liners for automotive vehicle equipment units generally comprise fiber bonded needled or tufted carpets or mats, warp knit type textiles for use as cladding for shelving or roof panels, sheets of TPO (Thermoplastic PolyOlefin) plastics possibly grained or cladding sheets made of flexibilized wood.

However, these coverings and liners present either properties that are limited in terms of abrasion resistance, or problems related to ease of cleaning.

There therefore exists a need for an economical liner, which is thermoformable and having a controlled sound absorption.

Fabrics constituted of yarns, comprising a sheath of polyvinyl chloride (PVC) and a core made of semi-crystalline polyethylene terephthalate (PET) are already known. The term 'semi-crystalline PET', is used to refer to PET having, for example, a degree of crystallinity that is higher than 20%.

Such fabrics are strong and solid and have very low deformability. These fabric materials are appropriate for floor coverings in the housing and habitat development sector and for exterior applications because of their high resistance to water and their mechanical strength. In addition, the PET core presents a rigidity that facilitates the weaving of the filament yarn.

However, such types of fabrics are not used for the manufacture of automotive vehicle equipment parts or units with irregularly shaped forms due to constraints related to thermoforming thereof. Indeed, such types of fabrics are not deformable under the operating conditions of the molding or formation lines and with the composite bodies generally associated with the coverings and liners.

In fact, when the vehicle equipment part/unit to be formed is an element of a sound-absorbing complex in the vehicle flooring, it is necessary to have a covering or liner that is capable of conforming to the formed shape of the complex. For example, the floor coverings are combined with other products, such as heavy weights or felts for acoustics related reasons and/or in order to give them sufficient stiffness that will make possible the appropriate positioning thereof within the vehicle quickly on the assembly lines.

The composite body covered by the covering or liner comprises, for example, a layer of ceramic fibers, for instance, glass fibers, with the ceramic fibers being embedded in a thermoplastic polymer matrix composed of polyolefin, such as polypropylene. The commercial term "Sommold' is used to refer to this type of material. This material being constituted of glass fibers and polypropylene, degrades very rapidly above 200° C.

However, the softening temperature of the PET is about 230° C. The semi-crystalline PET is thermoformable only from 230° C. onwards which renders impossible the combination thereof with the Sommold and therefore the forming thereof for use in the context of automotive coverings and liners. At 160° C., which is the melting point temperature of polypropylene, and temperature for the forming of Sommold, the PET is not thermoformable. At 230° C., the PET is thermoformable but the polypropylene degrades resulting in the equipment part having poor mechanical properties. Furthermore the PVC which constitutes the sheath of the filament yarns of the fabric also degrades very rapidly at temperatures above 200° C.

The Sommold and the fabric of the type described here above are thus incompatible and it is not possible to combine them in a composite equipment unit.

SUMMARY

An object of the invention is to provide a fabrication method for fabricating an equipment unit or part with use of such a fabric that is however, compatible with the forming methods dedicated to the manufacture of automotive floor coverings.

To this end, an embodiment of the invention provides a method of the abovementioned type comprising the following steps:
- supplying a sheet comprising ceramic fibers and thermofusible polymer fibers, the melting temperature of the thermofusible polymer being higher than 200° C.;
- heating of the sheet, at a temperature higher than 200° C., so as to cause melting of the thermofusible polymer;
- application of a fabric on the sheet, the fabric comprising filament yarns having a core made of polymer presenting a softening point temperature that is higher than or equal to 200° C.;
- thermoforming of the fabric and the sheet in a conforming mold.

This method according may comprise one or more of the following features taken into consideration individually or according to all technically possible combinations:
- the method comprises a step of thermal transfer between the sheet and the fabric after the heating of the sheet, the thermal transfer thereby enabling the heating of the fabric to a temperature that is higher than or equal to the softening point temperature of the core, preferably higher than 200° C.;
- the thermofusible polymer is polyethylene terephthalate;
- the filament yarns of the fabric have a core made of polyethylene terephthalate;
- the filament yarns of the fabric have a sheath comprising polyvinyl chloride;
- the conforming mold is maintained at a temperature of between 100° C. and 200° C., advantageously at 140° C.;
- the fabric and the sheet are maintained in the conforming mold for less than one minute;
- the method additionally also comprises the following steps:
    - application of a bonding film over the sheet, prior to the application of the fabric;

the fabric being applied over the bonding film, prior to the thermoforming;

the sheet presents a top surface and an opposite-facing surface, the fabric being attached on to the top surface of the sheet, with the method comprising the subsequent step of application of a non woven material on the opposite-facing surface of the sheet.

In accordance with an embodiment of the present invention, there is also provided an automotive vehicle equipment part comprising:

a composite body comprising a polymer matrix and ceramic fibers embedded in the matrix;

a fabric, the fabric comprising a top surface intended to be oriented towards a passenger compartment of the vehicle and an opposite-facing surface attached on to the composite body, the fabric being form-fitted to take the shape of the composite body;

characterized in that the fabric comprises filament yarns having a polymer core with a softening point temperature that is higher than or equal to 200° C.

The automotive vehicle equipment part according to the invention may comprise one or more of the following characteristic comprises taken into consideration individually or in accordance with all technically possible combinations:

the matrix of the composite body comprises polyethylene terephthalate;

the fabric comprises filament yarns having a core made of polyethylene terephthalate and a sheath comprising polyvinyl chloride;

the equipment part comprises a bonding film between the composite body and the fabric, bonding film preferably being of polyamide;

the fabric presents a thickness of less than 2 mm;

the composite body presents a top surface and an opposite-facing surface, with the fabric being attached on to the top surface of the composite body, the equipment part comprising a non woven material attached on to the opposite-facing surface of the composite body.

The equipment part comprises at least one sheet attached on to the composite body, the fabric being attached on to the sheet.

The equipment part comprises a first composite body, a second composite body and an intermediate spacer, the fabric being attached on to the first composite body.

BRIEF DESCRIPTION OF THE DRAWINGS

The invention will be better understood upon reviewing the description that will follow, given only by way of an example, and with reference made to the attached drawings, in which.

DETAILED DESCRIPTION

Figure 1:
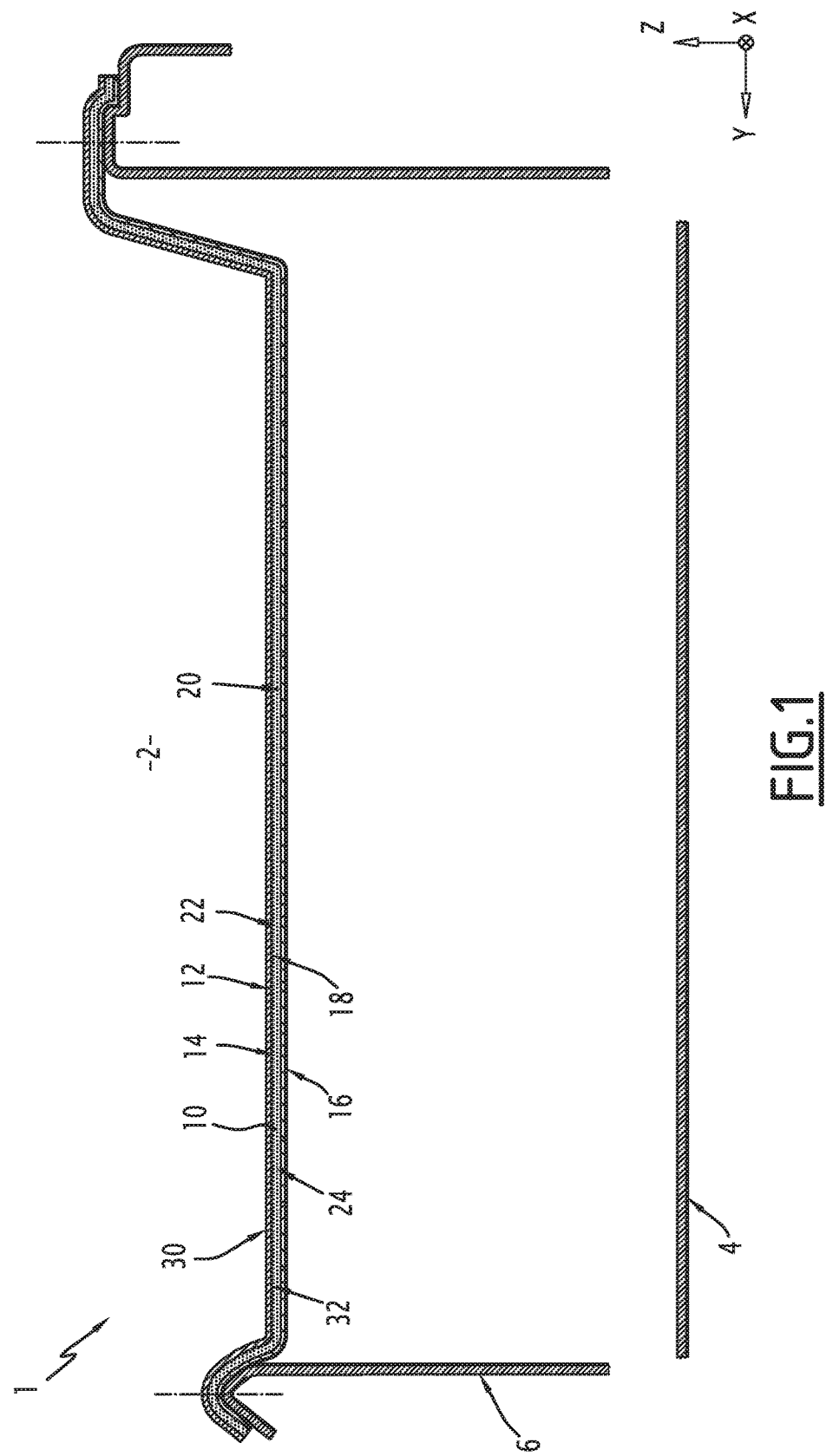
FIG. 1 is a cross sectional view, in a vertical plane, of an example of sub flooring element and a part of the vehicle body on which it is mounted.

FIG. 1 illustrates an example of an automotive vehicle equipment part 1 according to an embodiment of the invention.

The automotive vehicle equipment part 1 is intended to be placed in a passenger compartment 2 of the vehicle.

In the example described here, the automotive vehicle equipment part 1 is a false/sub flooring element. By way of a variant, the automotive vehicle equipment part 1 is an element of the dashboard, an element of the tunnel, a trim/lining complex for a shelf, for a trunk, a lateral trim/lining sound-absorbing complex, or other like elements.

The term tunnel is used to refer to the central part of the passenger compartment, which is generally raised above the floor, and separating the driver from the passenger.

FIG. 1 is oriented in the orthonormal frame of reference X, Y, Z corresponding to the normal orientation of a vehicle.

In this system of axes:

the X axis corresponds to the longitudinal axis of the vehicle, oriented in the direction of the forward travel;

the Z axis is the vertical axis oriented from bottom towards the top; and the Y axis is the transversal axis of the vehicle.

In the following sections of the description, the terms for position and orientation are to be understood in reference to this system of axes.

The automotive vehicle equipment part 1 is disposed in the passenger compartment of the vehicle 2.

The equipment part 1 exhibits characteristics related to sound absorption or acoustic/sound insulation in a manner so as to reduce noise disturbances. For example, the equipment part 1 is designed so as to acoustically insulate the passenger compartment from interior of the engine compartment.

In addition, the equipment part 1 presents a stiffness and a dimensional stability that is appropriate to the use thereof as flooring in the automotive vehicle.

In FIG. 1, the automotive vehicle equipment part 1 is represented in its assembled configuration fitted on a vehicle body. The vehicle body is represented schematically by a part of flooring of the body 4, and vertical edge walls 6, constituted of parts of the vehicle body that are integrally formed in one piece with the floor 4 or side frames that are integrally formed with the body.

The automotive vehicle equipment part 1 comprises a composite body 10 and a fabric 12, which is visible from the passenger compartment 2. The equipment part 1 also comprises, in addition, a bonding film 14 disposed between the fabric 12 and the wall 10. Advantageously, the equipment part comprises, in addition a non woven material 16, arranged opposite the fabric 12 on the composite body 10.

The automotive vehicle equipment part 1 presents a thickness comprised between 3 mm and 8 mm.

The composite body 10 has a top surface 18 intended to be oriented towards the passenger compartment 2 of the vehicle and an opposite-facing surface 20.

The composite body 10 presents, for example, advantageously a thickness comprised between 1 mm and 5 mm.

The composite body 10 has a substantially planar form, for example, with low reliefs when it involves for example a flooring or a form with highly accentuated reliefs when it involves a trunk shelving.

The composite body 10 comprises a polymer matrix 22 and a plurality of ceramic fibers 24 embedded in the matrix. The polymer matrix 22 binds the ceramic fibers 24 to each other.

The matrix 22 is formed of a thermofusible polymer as will be described in a subsequent section. The thermofusible polymer is advantageously constituted of a thermoplastic saturated polyester base, which is different from a thermosetting unsaturated polyester.

For example, the thermofusible polymer is polyethylene terephthalate (PET).

For example, the thermofusible polymer is a saturated polyethylene terephthalate (PET) obtained by means of polycondensation of terephthalic acid with ethylene glycol.

The thermofusible polymer advantageously has a glass (vitreous) transition temperature, measured by DSC ("Diffferential Scanning calorimetry") in accordance with the Standard ISO 11357-2, which is higher than 60° C., and in particular comprised between 75° C. and 85° C.

The thermofusible polymer has a melting point temperature in particular that is higher than 200° C., for example, comprised between 240° C. and 260° C.

The thermofusible polymer is advantageously semi-crystalline. It has a degree of crystallinity that is higher than 10%, in particular comprised between 20% and 40%. The thermofusible polymer has a temperature of crystallization, measured in accordance with the Standard ISO 11357-1 that is advantageously higher than 100° C., and in particular comprised between 140° C. and 160° C.

Thus the thermofusible polymer forming the matrix 22 has a melt flow index (or MFI) at 260° C. with a nominal load of 0.325 kg, such as measured in accordance with the Standard ISO 1133: 2005 Method A, that is greater than 20 g/10 mn, and in particular comprised between 20 g/10 mn and 60 g/10 mn, advantageously between 30 g/10 mn and 60 g/10 mn.

The softening point of the thermofusible polymer is comprised between 200° C. and 250° C. and advantageously between 220° C. and 240° C.

The mass proportion of thermofusible polymer in the composite body 10 is comprised between 30% and 70% by mass and the mass proportion of ceramic fibers 24 in the composite body 10 is comprised between 70% and 30% by mass. These percentages are calculated in relation to the total mass of the ceramic fibers 24 and the thermofusible polymer matrix 22.

The ceramic fibers 24 are, for example, glass fibers.

The ceramic fibers have an average length of less than 150 mm and a diameter of less than 50 microns.

The composite body 10 is obtained from an initial sheet 26 comprising a mixture of ceramic fibers 24 and thermofusible polymer fibers 28.

The initial sheet 26 is advantageously capable of being thermoformed at a temperature that is higher than or equal to 200° C., comprised between 260° C. and 300° C. and preferably at a temperature between 250° C. and 270° C.

The term "material capable of being thermoformed", is used to indicate that the material at a thermoforming temperature is ductile and capable of adopting the form of a mold. When the material cools down, the material will then maintain the resulting form obtained.

In the initial sheet 26 prior to the melting of the polymer fibers, the ceramic fibers 24 are dispersed in the thermofusible polymer fibers 28.

In the initial sheet 26 the mass proportion of the thermofusible polymer fibers 28 is similar to that of the composite body 10.

The initial sheet 26 has its own mechanical strength. It has a density, for example, comprised between 80 kg/m$^3$ and 150 kg/m$^3$.

The thickness of the initial sheet 26 is greater than 5 mm, and is, for example, comprised between 7 mm and 12 mm.

The weight and thickness of the initial sheet 26 are adapted in order to facilitate the thermal transfer which will be described in subsequent sections. The sheet 26 presents for example a weight of between 1500 g/m$^2$ to 2000 g/m$^2$.

The thermofusible polymer fibers 28 present an average length of less than 150 mm and titre comprised between 6.7 dTex and 17 dTex.

The fabric 12 is visible from the passenger compartment 2 of the vehicle.

The fabric 12 is disposed above the top surface 18 of the composite body 10.

The fabric 12 is attached on to the top surface 18 of the composite body 10, advantageously by the bonding film 14.

The fabric 12 comprises a top surface 30 intended to be oriented towards the passenger compartment 2 of the vehicle and one opposite-facing surface 32 attached to the composite body 10.

In the assembled equipment part, the fabric 12 is form fitted to the shape of the composite body 10.

In addition, the fabric 12 presents a thickness comprised between 1 mm and 2 mm and a weight of less than 500 g/m$^2$.

The weight and thickness of the fabric 12 are adapted in order to facilitate the thermal transfer which will be described in subsequent sections. Thus the weight of the fabric 12 is very much lower than that of the sheet 26.

The fabric 12 is suitable to be thermoformed at a temperature higher than 200° C., comprised between 220° C. and 260° C. and preferably at 230° C.

In addition, the fabric 12 has a Young's modulus measured in accordance with the standard NF EN ISO 527-3 at 20° C., that is greater than 2 Mega Pascal.

The fabric 12 is constituted of a plurality of filament yarns 34. The fabric 12 advantageously comprises warp yarns and weft yarns woven together therebetween.

The softening temperature of the filament yarns 34 of the fabric 12, is higher than 220° C.

Figure 2:
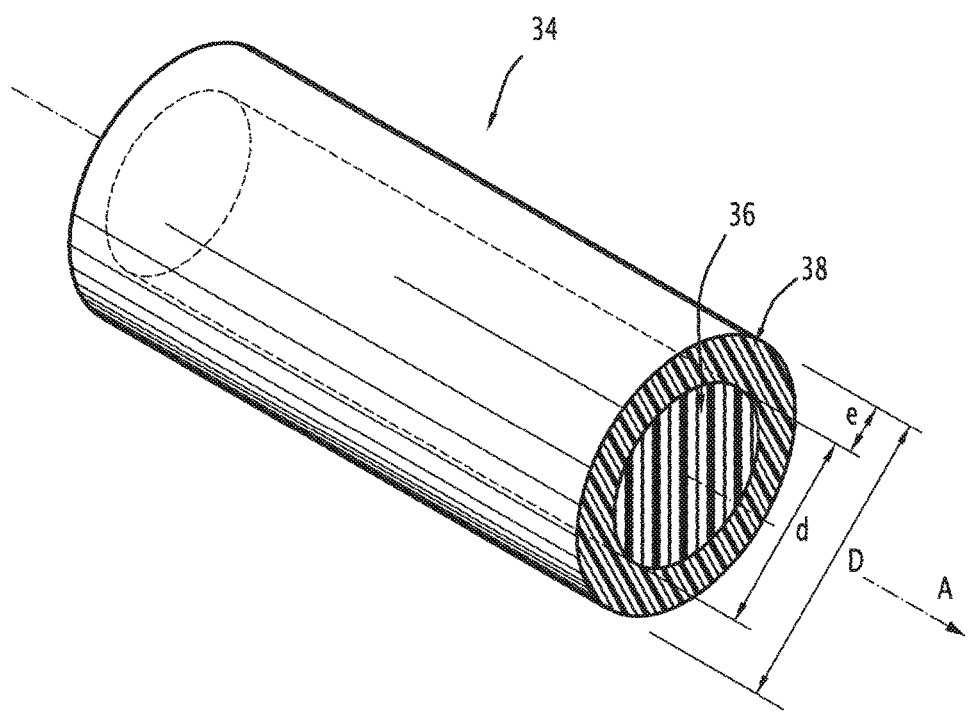
FIG. 2 represents a yarn of the fabric of the equipment part according to an embodiment of the invention.

A filament yarn 34 is represented in FIG. 2.

The filament yarn 34 comprises a core 36 and a sheath 38 covering the core 36.

The filament yarn 34 is extended along a principal axis A. The length of the filament yarn 34 along the principal axis A is adapted to the fabric 12.

In addition, the filament yarn 34 can withstand the tensile strength of the weave. In addition, the filament yarn 34 has a Young's modulus measured in accordance with the standard NF EN ISO 527-3 at 20° C., that is greater than 2 Mega Pascal.

The cross section of the filament yarn 34 taken transversely to the principal axis A is advantageously circular. The diameter D of the filament yarn 34 is less than 1 mm and is advantageously comprised between 0.4 mm and 0.6 mm.

The cross section of the core 36 taken transversely to the principal axis A is regular over the entire length of the filament yarn 34. The cross section of the core 36 is substantially a disk. The diameter d of the core 36 is comprised between 30% and 50% of the diameter D of the filament yarn 34.

The cross section of the sheath 38 taken transversely to the principal axis A is regular over the entire length of the filament yarn 34. The cross section of the sheath 38 is substantially a ring. The thickness e of the sheath 38 is comprised between 25% and 35% of the diameter D of the filament yarn 34.

The core 36 is made of polymer. The sheath 38 is made of polymer.

The softening point of the polymer of the core 36 is comprised between 200° C. and 250° C. and advantageously between 220° C. and 240° C.

For example, the core 36 comprises polyester terephthalate (PET). The core 36 advantageously comprises the PET in the form of a continuous filament. By way of a variant, the core 36 comprises the PET in the form of a spun fiber yarn.

The softening point of the polymer of the sheath 38 is below 200° C., in particular less than 130° C.

The polymer of the sheath 38 degrades from 200° C.

The sheath 38 comprises polyvinyl chloride (PVC). By way of a variant, the sheath 38 additionally also comprises plasticisers.

The PVC based sheath 38 begins to release its plasticiser towards 180° C.

The PVC degrades from 200° C.

The sheath 38 is capable of preventing the accumulation of dust.

The sheath 38 is integrally formed in one piece with the core 36. The sheath 38 is, for example, formed by means of extrusion around the core 36.

The fabric 12 is both porous and resistant. The weave, the diameter and the tightness of the filament yarns 34 of the fabric 12 is adapted so as to have the desired porosity and therefore a suitable resistance to the passage of air and the desired resistance to elongation.

The number of filament yarns 34 per cm of fabric 12 with respect to the warp direction as well as the weft direction is comprised between 5 and 15.

The resistance to the passage of air of the fabric 12 (RPP) measured in accordance with the standard ISO 9053 is comprised between 50 N.s.m$^{-3}$ and 500 N.s.m$^{-3}$.

The porosity of the fabric 12 confers the automotive vehicle equipment part 1 with improved sound absorption properties.

The fabric 12 has a resistance to abrasion that is particularly enhanced as compared to the fiber bonded needled or tufted carpets or mats, used usually in vehicles.

In addition, the fabric 12 is provided with a supplementary layer, thereby giving it other desirable properties such as resistance to friction and to abrasion, for example.

For example, the additional layer of the fabric 12 is a polyurethane (PU) lacquer or varnish that makes it possible to limit the release of materials such as plasticisers, for example, from the PVC based sheath. Advantageously, the lacquer is suitable for being heated to 140° C. without undergoing degradation. The lacquer is applied for example during the step of thermosetting immediately follows the step of weaving. This thermosetting step makes it possible to lightly solder the filament yarns to each other in a manner so as to avoid deformation of the fabric during the winding in view of its packaging.

The great resistance to friction that the polyurethane based additional layer gives the fabric 12, makes it possible to avoid the addition of heel pieces, for example, under the pedals of the vehicle.

In similar fashion, the simplicity and ease of cleaning and maintenance of this fabric 12 renders unnecessary the use of "floor/surface mats", that is to say, of pieces of removable carpeting that thereby provides the ability to limit soiling of the carpeting and simplify the cleaning of the passenger compartment interior.

The fabric 12 is dust-proof, that is to say, it is capable of preventing the dust present inside the passenger compartment 2 and being regularly deposited on the floor from being retained by the fabric 12. In addition, the fabric 12 is capable of preventing the proliferation of dust mites responsible for allergens.

The bonding film 14 is applied between the top surface of the composite body 10 and the opposite-facing surface 22 of the fabric 12. For example, the bonding film 14 is applied over the entire surface of the top surface 18 of the composite body 10. By way of a variant, the bonding film 14 is applied on certain zones of attachment only.

The bonding film 14 is capable of enabling the adhesion between the composite body 10 and the fabric 12.

The bonding film 14, for example, comprises polyamide (PA).

The bonding film 14 is, for example, a single layer of copolyamide. For example, the bonding film 14 is the film bearing the product reference L202.89 of the company PROCHIMIR.

The bonding film 14 presents a strong affinity with the polymer of the sheath 32. For example, the bonding film 14 is compatible with the PVC thereby allowing for a strong adhesion between the composite body 10 and the fabric 12.

The weight and thickness of the bonding film 26 are adapted in order to facilitate the thermal transfer which will be described in subsequent sections. Thus the film 26 has a much lower weight than the sheet 26 for example 100 g/m$^2$.

The bonding film 14 presents a thickness that is less than or equal to 50 micrometers.

The bonding film 14 presents a melting point temperature comprised between 120° C. and 140° C.

In FIG. 1, the non-woven material 16 is fixed on to the opposite-facing surface 20 of the composite body 10.

The non-woven material 16 is capable of ensuring provision of dimensional stability to the complex. In addition, the non-woven material 16 makes it possible to obtain an equipment part 1 with a reverse or underside surface that is not rough and not having ceramic fibers 24 extending beyond the composite body 10.

The non-woven material 16 advantageously comprises non-woven PET fibers. The non-woven material 16 is deformable by the sliding of the PET fibers against each other under the effect of stretching. However, the PET fibers of the non-woven material 16 after heating to 140° C., retain the same properties of rigidity.

Figure 3:
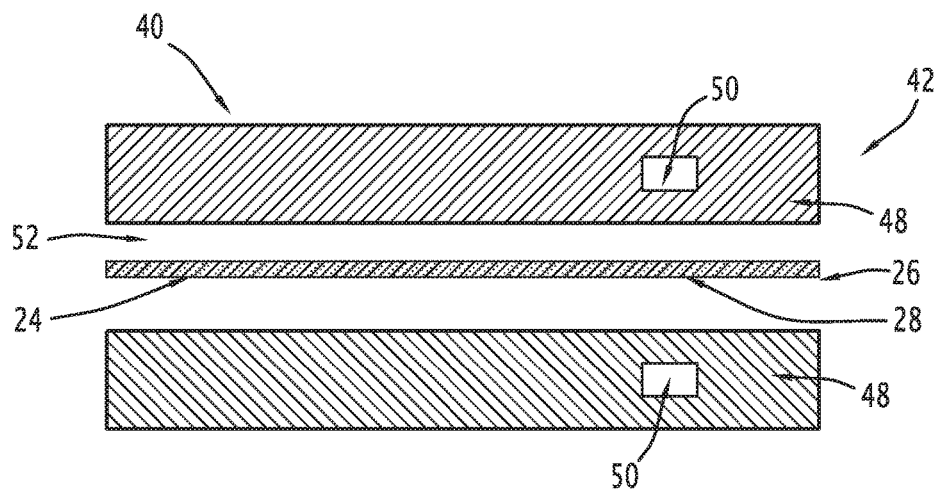
FIG. 3 is a view of a heating unit of an assembly for the fabrication of an equipment part according to an embodiment of the invention during a fabrication step.
Figure 4:
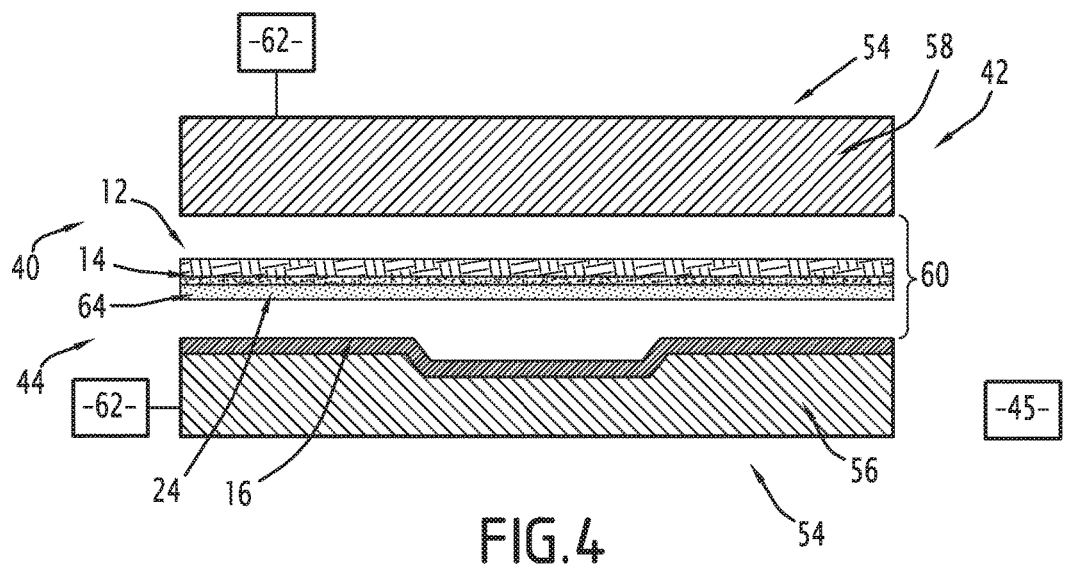
FIG. 4 is a cross sectional view of a thermoforming unit during a later step of fabrication.

A fabrication assembly 40 for fabricating the equipment part 10, intended to be used in the operational implementation of the method according to the invention is illustrated in FIGS. 3 and 4.

The fabrication assembly 40 comprises a heating unit 42 visible in FIG. 3, a thermoforming unit 44 visible in FIG. 4 and a film application unit 45 for applying the bonding film.

The heating unit 42 comprises at least one support plate 48 for supporting a sheet and at least one heating means 50 for heating the sheet.

The heating unit 42 is capable of heating the initial sheet 26 to a temperature that is higher than 200° C., advantageously comprised between 210° C. and 300° C., ideally to 270° C.

In the example shown in FIG. 3, the heating unit 42 comprises a pair of plates 48 positioned to be facing each other and designed for preforming the sheet 26.

The pair comprises two plates 48 positioned to be facing each other delineating between them an intermediary space 52.

Advantageously, a heating means 50 is arranged in each plate 48 in order to heat the initial sheet 26 directly by contact.

Furthermore these heating means 50 are mounted on a low-power press which however is still capable of exerting a force of 10 tonnes so as to enable the compression of the initial sheet 26.

In the example shown in FIG. 4, the thermoforming unit 44 consists of a mold 54 which comprises a first half-mold 56 and a second half-mold 58 delimiting between them a molding cavity 60. The mold 54 presents the final form of the equipment part 1. The lower half-mold is represented as a hollow in the FIG. 4.

The thermoforming unit 44 additionally also comprises the temperature regulation means 62 for regulating the temperature of each half-mold 56, 58.

The height of the molding cavity 60 corresponds to the thickness of the equipment part 1.

A fabrication method for fabricating an automotive vehicle equipment part 1 will now be described with reference to the FIGS. 3 and 4.

The method comprises a step of supplying of the initial sheet 26, a step of heating of the initial sheet 26, a step of application of the bonding film 14, a step of application of the fabric 12 and a step of thermoforming. Advantageously, the method also comprises a step of lacquering or varnishing.

During the supply step, an initial sheet 26 formed out of ceramic fibers 24 and thermofusible polymer material fibers 28 is supplied. This initial sheet 26 is cut in order to present an exterior contour corresponding to the dimensions of the equipment part 1.

The initial sheet 26 has been advantageously made by using an air dispersion method or referred to as "airlay" that provides the ability to easily treat and method mixtures of fibers 24, 28 of all kinds. It may be also prepared by the conventional dry route (carding followed by coating). After the constitution thereof, the initial sheet 26 is reinforced by needling so as to enable easier handling.

Similarly, a fabric 12 is supplied and is cut in order to present an outer contour corresponding to the dimensions of the equipment part 1.

Subsequently, during the heating step, the initial sheet 26 is introduced into the heating unit 42, as shown in FIG. 3. Then, the initial sheet 26 is placed so as to rest against the plates 48.

During the heating step, the initial sheet 26 is heated up to a heating temperature that is higher than the melting temperature of the thermofusible polymer of which the polymer fibers 28 are constituted.

The heating temperature is higher than 200° C. For example, the plates are maintained at 270° C. by the heating means 50.

This heating is carried out over a period of more than 10 seconds of residence time, and in particular comprised between 30 and 45 seconds. For example, this temperature is higher than 200° C., and in particular comprised between 250° C. to 270° C.

The step of heating serves to cause the melting of the thermofusible polymer material fibers 28 and cause adhering of the molten thermofusible polymer to the ceramic fibers 24.

During the step of heating of the initial sheet 26, the initial sheet 26 is advantageously compressed. The pressure applied in the heating unit 42 on the one hand allows for the transfer of calories, and on the other hand, enables the compression of the sheet 26 in order to form a preformed sheet having the desired density. The initial sheet 26 is compressed up to the required density, that is to say between 500 kg/m$^3$ and 1500 kg/m$^3$.

Thus, when the composite body 10 is fabricated in the heating unit 42, a compression is brought about on the initial sheet 26 between the plates 48 in order to reduce the thickness of the initial sheet 26. This reduction is, for example, in the order of a one fifth ratio, advantageously one tenth ratio.

Thus, when the initial sheet 26 initially presents a thickness comprised between 12 mm and 7 mm, subsequently between the plates 48 of the heating unit 42 it consist of a thickness comprised between 2 mm and 0.5 mm, which corresponds approximately to the final density required for the composite body 10. The pressure applied in the heating unit 42 is, for example, 6 bars which is likely to be produced by a 10 tonne press.

The residence time in the heating unit 42 makes it possible to heat the thermofusible polymer fibers 28 up to a temperature that is higher than the melting temperature. The thermofusible polymer in the fibers 28 is then at least partly in liquid form and impregnates the ceramic fibers 24.

At the end of this step of heating of the initial sheet 26, the resultant product is referred to as the "pre-formed sheet" 64. Indeed, the composite body 10 as such is not actually constituted, because the polymer which is still molten does not strictly speaking constitute the matrix 22 of a composite body 10.

However, this intermediate product is able to be manipulated.

The preformed sheet 64 is removed from the heating unit 42.

It should be noted that once removed from the heating unit 42, on account of the resilience of the ceramic fibers 24 and due to the fact that the matrix 22 has not been constituted, the preformed sheet 64 could possibly regain some thickness. The preformed sheet 64 therefore has a density approaching the final density of the composite body 10. The difference in density between the preformed sheet 64 and the final composite body 10 thus is comprised between 50% and 100%.

Subsequently, after the exit from the heating unit 42, the bonding film 14 is applied on to the preformed sheet 64.

The bonding film 14 for example originates from a coil. The bonding film 14 is previously cut to the dimensions of the equipment part 1.

The bonding film 14 is applied on to the preformed sheet 64 by the film application unit 45.

Thereafter, the fabric 12 is applied on to the preformed sheet 64 which is covered with the bonding film 14.

The walls of the conforming mold 54 are maintained, by the thermal regulation unit 62, advantageously at the desired constant set point temperature that advantageously corresponds to the crystallization temperature of the thermofusible polymer present in the sheet.

The conforming mold 54 is maintained at a temperature comprised between 100° C. and 200° C., advantageously at 140° C. which is the crystallization temperature of the PET used.

Alternatively, the mold is regulated in order to be maintained at ambient temperature.

The complex consisting of the composite body 10, the film 16 and the fabric 12 is introduced into the molding cavity 60 between two half molds 56, 58, as represented in FIG. 4.

The non-woven material 16 is, for example, placed in the bottom of the thermoforming lower half-mold 54. The complex is introduced in the lower half-mold 54 in a manner such that the opposite-facing surface 20 of the sheet is in contact with the non-woven material 16.

Upon conclusion of the step of application of the fabric 12 on the preformed sheet 64, the method comprises a step of thermal transfer.

The thermal transfer time is the time between the start of the application of the fabric 12 on to the preformed sheet 64 and the closure of the mold.

During the thermal transfer, the calories from the preformed sheet 64 are transferred rapidly to the bonding film 16 and to the fabric 12 due to their low weight.

It is necessary at the time of the closure of the mold, for the core 36 of the filament yarns 34 to reach a temperature that is higher than 200° C. in order that it can be thermoformed.

This time of transfer must therefore be as short as possible. The thermal transfer time is conditioned by the thermal inertia of the composite sheet 64 and thus by its weight. The thermal transfer time is less than or equal to 10 s. Advantageously, it is comprised between 5 and 10 s.

The thermal transfer time is adapted in order to allow for the heating of the fabric 12 at a temperature that is higher than or equal to the softening temperature of the fabric 12, preferably higher than 200° C.

In addition the thermal transfer time is short enough so as to limit the degradation of the polymer of the sheath 38.

In particular, the thermal transfer time is suitable so as to limit the degradation of the sheath and the exudation of plasticisers when the sheath is made of PVC.

So this mode of thermal transfer by the composite sheet 64 having high thermal inertia toward the fabric having low thermal inertia makes it possible in a surprising fashion to reach the softening temperature of the core 36 of the filament yarns 34 with this however being during a window of time that is sufficiently short so as to not degrade the PVC sheath 38. This window is used to advantage in order to thermoform the assembly and in particular the fabric 12.

Following the thermal transfer the bonding film 14 reaches its melting point temperature.

In addition, the non-woven material 16 adheres to the preformed sheet 64 on account of the contact with the molten thermofusible polymer.

Because of the thermal transfer at the time of the closure of the mold 54, the temperature within the fabric 12 corresponds to the softening temperature of the fabric. For example, the temperature of the fabric at the time instant of the closure of the mold is comprised between 200° C. and 240° C.

When the mold 54 is closed, the preformed sheet 64 and the fabric 10 then adopt a form that is closely fitted to that of the volume that is receiving it. The molding cavity 60 subsisting between the walls of the mold 54 then corresponds to the thickness desired for the final equipment part 1.

During the step of thermoforming, the fabric 12 and the preformed sheet 54 are form-fitted taking on the shape of the mold 54 in order to form the composite body 10 provided with a fabric cover 12. The fabric 12 is fitted to take on the shape of the composite body 10. In addition, during the thermoforming step, the fabric 12 is attached to the composite body 10.

The fabric 10 and the preformed sheet 64 are kept in the closed mold 54 over a residence time of more than 10 seconds, and in particular comprised between 30 seconds and 45 seconds, this being in order to ensure proper crystallization of the polymer.

The polymer in hardening forms the matrix 22 of the composite body 10. Advantageously, the recrystallization at least partially of the polymer takes place so as to bring about enhanced mechanical performance.

The pressure applied between the walls of the mold 54 promotes the bonding of the fabric 12 on to the composite body 10.

Thereafter, the equipment part 1 formed is extracted out of the mold 54.

By way of a variant, the non-woven material 16 is bonded to the composite body 10 prior to the setting in place thereof in the thermoforming mold 54. By way of a variant, the non-woven material 16 is bonded to the composite body 10 after the exit thereof from the thermoforming mold.

The method advantageously comprises a step of lacquering. For example, the lacquering is carried out prior to the thermoforming step. During the lacquering step, the additional layer is added to the fabric 12, for example, by means of spraying and UV cross-linking. By way of a variant, the additional layer is added on to the finished equipment part 1.

By way of a variant, a fabric 12 is applied on the two surfaces of the composite body 1 of the equipment part 1. This is advantageous if the equipment part 1 is intended to be visible from both sides, for example, when the equipment part 1 is a shelf. Advantageously, the fabric 12 contributes to the mechanical performance of the equipment part 1.

The embodiment that has just been described provides an equipment part 1 that is abrasion resistant and easily washable, which avoids the addition of floor/surface mats and heel pieces. In addition, the equipment part 1 is resistant to UV due to the presence of the fabric 12 on the surface thereof exposed to the light.

In addition, the fabric 12 presents good acoustic characteristics that allow for proper soundproofing.

In addition, the fabrics 12 made from PVC sheathed filaments present a decorative look and are available with different textures or colours.

The equipment part 1 is easy to fabricate with a single step of thermoforming.

In addition, the fabrics 12 used have a substantial Young's modulus. The fabrics 12 provide the ability to contribute to the mechanical strength of the equipment part 1 in order to limit the sag or creep. The properties and capabilities of the fabrics 12 thus make it possible to reduce the weight of the composite body 10 used in the equipment part 1.

Figure 5:
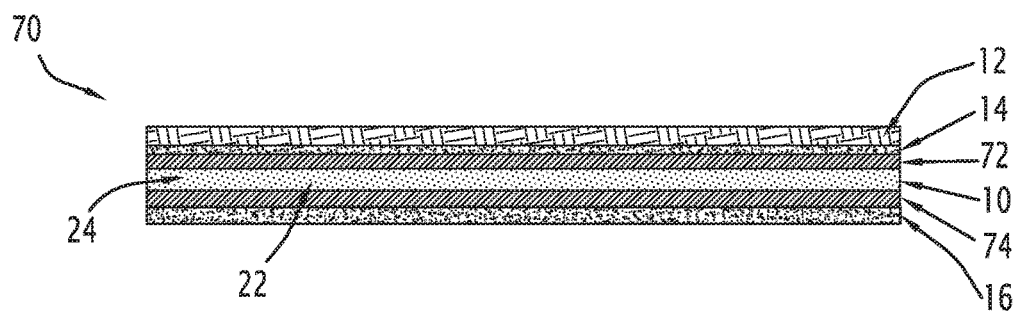
FIG. 5 is a partial cross sectional view of a second equipment part fabricated by a method according to an embodiment of the invention.

A second automotive vehicle equipment part 70 according to an embodiment of the invention will now be described with reference to FIG. 5.

The second equipment part 70 differs from the first equipment part 1 in that it contains at least one sheet 72, 74 between the composite body 10 and the bonding film 14. For example, the equipment part comprises a first sheet 72 attached on to the top surface 18 of the composite body 10 and a second sheet 74 attached on to the opposite-facing surface 20 of the composite body 10.

The sheets 72, 74 advantageously cover the entirety of all the surfaces 18, 20 of the composite body 10, in particular more than 95% of the extent of each surface 18, 20.

The sheet 72, 74 presents a thickness that is less than that of the composite body 10. Advantageously, the thickness of the sheet 72, 74 is far lower than that of the composite body 10 and is, for example, less than 5% of the maximum thickness of the composite body 10.

Each sheet 72, 74 is attached on to one surface 18, 20 10 of the composite body, advantageously by partial impregnation of the thermofusible polymer of the matrix 22 in the sheet 72, 74.

For this purpose, the matrix 22 penetrates into the sheet 72, 74 over a thickness that is advantageously greater than 50% of the thickness of the sheet 72, 74 and notably less than 80% of the thickness of the sheet 72, 74.

The sheet 72, 74 presents a mass per unit area (area density) of less than 100 g/m², in particular less than 80 g/m², advantageously less than 60 g/m².

The sheet 72, 74 is porous. It thus presents a plurality of openings that determine its wettability by capillary action. The wettability of the sheet 72, 74 depends on the critical surface tension of the fibers of which it is constituted, the average size of the pores between these fibers and the pressure applied between the hot plates 48 during the heating of the initial sheet 26. By adjusting these three parameters in relation to the flow index of the thermofusible polymer and to the surface tension of the molten polymer, the penetration of the polymer within the constituent material of the sheets 72, 74, under adjusted pressure is controlled.

In the equipment part 70 according to the invention, the polymer forming the matrix 22 penetrates as far as possible, at least over half of the thickness of the sheet, without however, passing through them. Thus, the sheet 72, 74 ensures a continuity with the matrix 22 of the composite body 10 and presents similar mechanical properties.

The sheet 72, 74 comprises a porous material. For example, the sheet 72, 74 is constituted of paper. The paper presents a mass per unit area (area density) of less than 80 g/m². It is, for example, made up of manufactured plant-, mineral-, animal-, or synthetic fibers or constituted of a mixture of these fibers by means of the deposit and compression of fibers on an appropriate forming device.

The fabrication method for the second equipment part differs from the fabrication method for the first equipment part in that the sheets 72, 74 are applied on to the initial sheet 26.

During the supply step the sheets 72, 74 are supplied.

Thereafter, the initial sheet 26 is covered with at least one sheet 72, 74. Advantageously, the initial sheet 26 is interposed between two sheets 72, 74. A first sheet 72 is disposed on a first surface of the initial sheet 26 and a second sheet 74 is disposed on a second surface of the initial sheet 26.

Thereafter, during the heating step, the initial sheet 26 provided with at least one sheet 72, 74 advantageously with two sheets 72, 74 on its opposite-facing surfaces is introduced into the heating unit 42, positioned to rest against the plates 48. During the heating step, the force exerted by the heating means 42 enables the wetting of the sheets by the thermofusible polymer. The sheet 72, 74 is integrated into the preformed sheet 64 during the heating step. The polymer of the matrix 22 binding the ceramic fibers of the initial sheet 26 to each other, penetrates partially into each of the sheets 72, 74, while being confined between the sheets 72, 74 in order to improve the mechanical properties of the body 10 and to promote the attachment of the sheets 72, 74 on to the sheet 64. In addition, the sheets 72, 74 remain porous because being partially penetrated by the matrix, they constitute favoured sites for attachment of other layers, such as the bonding film 14 or the non-woven material 16.

The sheets 72, 74 prove to be necessary when the fabric 12 is very decontextured that is to say, having few yarns per cm². The sheets limit the risk of the ceramic fibers 24 passing through the fabric 12. In addition, the sheets 72, 74 advantageously present a color that is suitable for the color of the fabric.

At the end of the heating step, the handling and manipulation of the preformed sheet is facilitated by the presence of the sheets 72, 74.

Subsequently, after the exit from the heating unit, the bonding film is applied on the sheet 72 64 of the preformed sheet.

Figure 6:
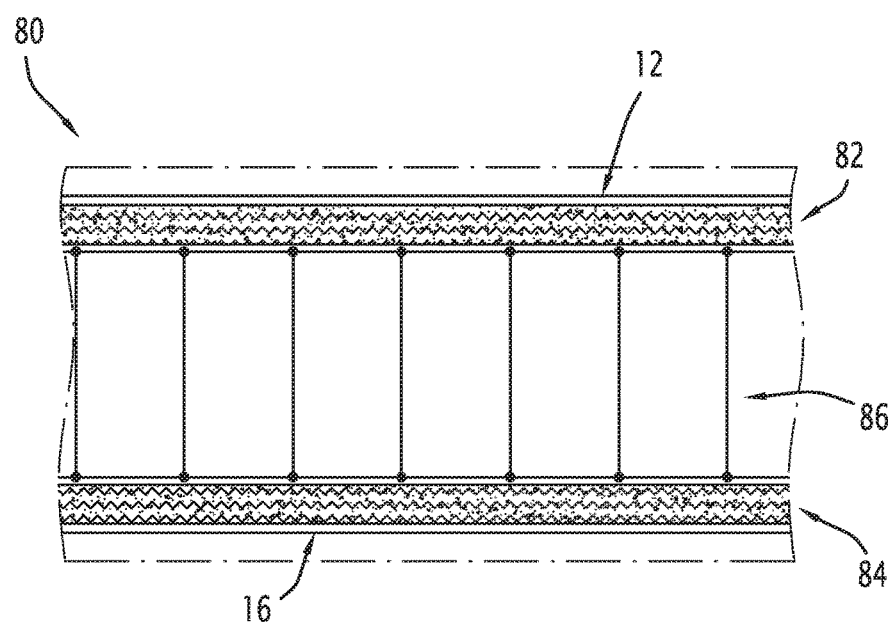
FIG. 6 is a partial cross sectional view of a third equipment part fabricated by a method according to an embodiment of the invention.

A third automotive vehicle equipment part 80 according to an embodiment of the invention is described in FIG. 6.

The third equipment part 80 differs from the first equipment part 1 and second equipment part 70 in that the third equipment part 80 comprises a first composite body 82, a second composite body 84, and an intermediate spacer 86. The composite bodies 82, 84 are attached on to the opposite-facing surfaces of the intermediate spacer 86.

Advantageously, 86 the spacer is made based on an alveolar or honeycomb like structure.

Thus, the spacer 86 has a plurality of walls 88 substantially perpendicular to a mean plane of the equipment part 1, the walls 88 delimiting the closed contour central spaces 90 forming the cell like alveoli. Thus, each central space 90 or alveolus opens out so as to be facing a body 82, 84.

The spacer 14 is advantageously made of a light material, such as paper or cardboard.

The fabrication method for the third equipment part 80 differs in that the mold 54 is advantageously suitable for carrying out the assembly of the bodies 82, 84 on the spacer 14.

The spacer 14 previously cut to the required dimensions is covered with binder on both the surfaces, for example, by means of the roller adhesive applicators.

The fabrication method differs in that the method comprises a step of heating of each initial sheet 26 intended to form a composite body 82, 84 and an assembly phase for assembling each composite body 82, 84 on the spacer 14.

The fabric 12 is applied on to at least one of the preformed composite bodies 82, 84.

The molding cavity is adapted in order to receive the preformed composite body, the spacer 84 and the fabric 12.

The third equipment part 80, for example, is a double-shelled panel with composite body covered with a decor liner made of fabric 12 on a top surface and with a non woven material 16 on an underside surface.

The invention claimed is:

1. A fabrication method for fabricating an automotive vehicle equipment part, comprising the following steps:
    supplying a sheet comprising ceramic fibers and thermofusible polymer fibers, the melting temperature of the thermofusible polymer being higher than 200° C.;
    melting of the thermofusible polymer by heating the sheet at a temperature higher than 200° C.;
    applying a fabric on the sheet, the fabric comprising filament yarns having a core made of polymer presenting a softening point temperature that is higher than or equal to 200° C.;
    thermoforming the fabric and the sheet in a conforming mold.

2. A fabrication method according to claim 1, comprising a step of thermal transfer between the sheet and the fabric after the heating of the sheet, the thermal transfer thereby enabling the heating of the fabric to a temperature that is higher than or equal to the softening point temperature of the core.

3. A fabrication method according to claim 1, wherein the thermofusible polymer is polyethylene terephthalate (PET).

4. A fabrication method according to claim 1, wherein the filament yarns of the fabric have a core made of polyethylene terephthalate (PET).

5. A fabrication method according to claim 1, wherein the filament yarns of the fabric have a sheath comprising polyvinyl chloride (PVC).

6. A fabrication method according to claim 1, wherein the conforming mold is maintained at a temperature between 100° C. and 200° C., advantageously at 140° C.

7. A fabrication method according to claim 1, wherein the fabric and the sheet are maintained in the conforming mold for less than one minute.

8. A fabrication method according to claim 1, further comprising the following steps:
 application of a bonding film over the sheet, prior to the application of the fabric;
 the fabric being applied over the bonding film prior to the thermoforming.

9. A fabrication method according to claim 1, wherein the sheet presents a top surface and an opposite-facing surface, the fabric being attached on to the top surface of the sheet, with the method comprising the following step:
 application of a non-woven material on the opposite-facing surface of the sheet.

10. An automotive vehicle equipment part comprising:
 a composite body comprising a polymer matrix and ceramic fibers embedded in the matrix;
 a fabric, the fabric comprising a top surface intended to be oriented towards a passenger compartment of the vehicle and an opposite-facing surface attached to the composite body, the fabric being form-fitted to take the shape of the composite body;
 wherein the composite body and fabric are molded and wherein the fabric comprises filament yarns having a polymer core with a softening point temperature that is higher than or equal to 200° C.

11. An equipment part according to claim 10, in which the matrix of the composite body comprises polyethylene terephthalate (PET).

12. An equipment part according to claim 10, wherein the fabric comprises filament yarns having a core made of polyethylene terephthalate (PET) and a sheath comprising polyvinyl chloride (PVC).

13. An equipment part according to claim 10, comprising a bonding film between the composite body and the fabric.

14. An equipment part according to claim 13, wherein the bonding film comprises polyamide (PA).

15. An equipment part according to claim 10, wherein the fabric presents a thickness of less than 2 mm.

16. An equipment part according to claim 10, wherein the composite body presents a top surface and an opposite-facing surface, with the fabric being attached on the top surface of the composite body, the equipment part comprising a non-woven material attached to the opposite-facing surface of the composite body.

\* \* \* \* \*